United States Patent
Kim et al.

(10) Patent No.: US 12,337,640 B2
(45) Date of Patent: Jun. 24, 2025

(54) APPARATUS AND METHOD FOR CONTROLLING SUSPENSION OF VEHICLE

(71) Applicants: HYUNDAI MOTOR COMPANY, Seoul (KR); KIA CORPORATION, Seoul (KR)

(72) Inventors: Hyung Jin Kim, Seoul (KR); Young Jae Kim, Yongin-si (KR); Yoon Kab Noh, Gunpo-si (KR); Jong Hoon Choi, Hwaseong-si (KR); In Yong Jung, Incheon (KR); Byung Joo Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 749 days.

(21) Appl. No.: 17/313,201

(22) Filed: May 6, 2021

(65) Prior Publication Data
US 2022/0105773 A1  Apr. 7, 2022

(30) Foreign Application Priority Data
Oct. 5, 2020  (KR) .................. 10-2020-0128304

(51) Int. Cl.
*B60G 17/0165* (2006.01)
*B60G 17/018* (2006.01)

(52) U.S. Cl.
CPC ....... *B60G 17/0165* (2013.01); *B60G 17/018* (2013.01); *B60G 2400/252* (2013.01);
(Continued)

(58) Field of Classification Search
CPC ............ B60G 17/0165; B60G 2500/10; B60G 2800/019; B60W 2420/408; B60W 2552/15
(Continued)

(56) References Cited

U.S. PATENT DOCUMENTS 4,422,322 A * 12/1983 Spangler ................. G01B 7/28
  73/146
4,647,068 A *  3/1987 Asami ................ B60G 17/0165
  280/5.517
(Continued)

FOREIGN PATENT DOCUMENTS

| DE | 102015205369 A1 | 10/2015 |
| KR | 10-2019-0128290 A | 11/2019 |
| KR | 10-2021-0022296 A | 3/2021 |

OTHER PUBLICATIONS

Office Action mailed Apr. 4, 2023 cited in corresponding U.S. Appl. No. 17/313,186; 11 pp.
(Continued)

*Primary Examiner* — Logan M Kraft
*Assistant Examiner* — Joshua Campbell
(74) *Attorney, Agent, or Firm* — Lempia Summerfield Katz LLC

(57) ABSTRACT

An apparatus for controlling a suspension of a vehicle to improve high-speed driving stability of the vehicle includes: a sensor that obtains information about a road surface ahead the vehicle during travel of the vehicle; and a controller that derives a height value of the road surface from the information about the road surface, determines a state of the road surface based on a differential value of the derived height value, predicts vehicle behavior corresponding to the determined state of the road surface, and controls a damping force of the suspension based on the predicted vehicle behavior.

16 Claims, 14 Drawing Sheets

(52) U.S. Cl.
CPC .... *B60G 2400/821* (2013.01); *B60G 2500/10* (2013.01); *B60G 2600/1877* (2013.01); *B60G 2800/0192* (2013.01)

(58) Field of Classification Search
USPC .................................................. 701/37, 45
See application file for complete search history.

(56) References Cited

U.S. PATENT DOCUMENTS

| | | | | |
|---|---|---|---|---|
| 4,729,580 | A * | 3/1988 | Buma | B60G 17/0165 280/5.513 |
| 5,699,056 | A | 12/1997 | Yoshida | |
| 6,543,799 | B2 * | 4/2003 | Miyoshi | B62K 25/28 280/283 |
| 8,762,000 | B2 * | 6/2014 | Schindler | B60G 17/018 701/41 |
| 9,855,949 | B2 | 1/2018 | Tomatsu et al. | |
| 10,406,882 | B2 | 9/2019 | Lakehal-ayat | |
| 10,479,158 | B2 * | 11/2019 | Bennett | B60W 30/08 |
| 10,967,849 | B2 | 4/2021 | Jang | |
| 11,267,307 | B2 | 3/2022 | Lakehal-ayat | |
| 2005/0021205 | A1 * | 1/2005 | Niwa | B60G 17/016 701/37 |
| 2009/0254250 | A1 * | 10/2009 | Koo | B60W 30/18145 701/37 |
| 2013/0103259 | A1 * | 4/2013 | Eng | B60G 17/0165 701/37 |
| 2013/0258108 | A1 | 10/2013 | Ono et al. | |
| 2014/0195112 | A1 * | 7/2014 | Lu | B60G 17/015 703/2 |
| 2014/0324296 | A1 * | 10/2014 | Laoufi | B60R 22/48 701/45 |
| 2015/0166072 | A1 | 6/2015 | Powers et al. | |
| 2015/0274105 | A1 * | 10/2015 | Le Merrier | B60W 30/085 701/45 |
| 2015/0352920 | A1 * | 12/2015 | Lakehal-Ayat | B60G 17/0182 701/38 |
| 2016/0111089 | A1 | 4/2016 | Kim | |
| 2016/0259983 | A1 | 9/2016 | Tani et al. | |
| 2019/0232748 | A1 | 8/2019 | Mohamed et al. | |
| 2019/0344634 | A1 * | 11/2019 | Kim | B60G 17/0165 |
| 2020/0016952 | A1 | 1/2020 | Lakehal-ayat | |
| 2020/0221270 | A1 | 7/2020 | Ikkaku | |
| 2020/0384979 | A1 | 12/2020 | Hiraga | |
| 2020/0396292 | A1 | 12/2020 | Ono | |
| 2021/0009165 | A1 | 1/2021 | Sugimoto et al. | |
| 2021/0053409 | A1 | 2/2021 | Kim | |
| 2021/0114559 | A1 | 4/2021 | Okura | |
| 2021/0269062 | A1 | 9/2021 | Yasutomi et al. | |
| 2021/0383140 | A1 | 12/2021 | Kim | |
| 2022/0097557 | A1 | 3/2022 | Lee et al. | |

OTHER PUBLICATIONS

Office action issued on Sep. 8, 2023 for the related U.S. Appl. No. 17/313,173. 12pp.
Office action issued on Mar. 15, 2024 for the related U.S. Appl. No. 17/313,173. 10pp.
Office Action cited in German patent application No. 10 2021 112 874.9; Nov. 8, 2023; 7 pp.
Office action issued on Oct. 18, 2023 for the related U.S. Appl. No. 17/313,186. 11pp.

\* cited by examiner

APPARATUS AND METHOD FOR CONTROLLING SUSPENSION OF VEHICLE

CROSS-REFERENCE TO RELATED APPLICATION

This application claims priority to and the benefit of Korean Patent Application No. 10-2020-0128304, filed on Oct. 5, 2020, the entire contents of which are incorporated herein by reference.

FIELD

The present disclosure relates to a technology for improving high-speed diving stability by controlling a suspension of a vehicle.

BACKGROUND

The statements in this section merely provide background information related to the present disclosure and may not constitute prior art.

In general, a suspension of a vehicle is an apparatus that is connected with a vehicle axle and that is controlled such that vibration or shock from a road is not directly transmitted to a vehicle body during travel of the vehicle, thereby preventing damage to the vehicle body, a passenger, or freight and a safety accident and improving ride comfort of the vehicle.

The suspension, called a suspension apparatus, may include a chassis spring that alleviates shock from a road, a shock absorber that controls free vibration of the chassis spring to improve ride comfort, and a stabilizer bar that prevents rolling of the vehicle.

Recently-released vehicles are equipped with Electronically Controlled Suspension (ECS) that automatically adjusts the strength of the suspension depending on a driving situation or a state of a road surface.

The Electronically Controlled Suspension (ECS) may detect driving state information, such as a vehicle speed, a steering angle, up and down acceleration of a vehicle body, and the like, and road-surface information through various sensors and may electronically automatically control the spring constant of the suspension, the damping force of a shock absorber, the posture of the vehicle body, the vehicle height, and the like according to a road-surface state.

Electronically controlled suspension (ECS) may be classified into active suspension that controls a movement of a vehicle body by applying external energy to the suspension using an actuator and semi-active suspension that adjusts a damping force using an actuator as an auxiliary spring.

A conventional technology for controlling electronically controlled suspension may not accurately recognize a state of a road surface (e.g., an uphill road, a downhill road, or a corrugated road) ahead a vehicle from an image of the road surface that is taken with a camera included in the vehicle travelling at high speed. Therefore, the conventional technology may not accurately predict behavior of the vehicle and may not accurately control the damping force of the suspension.

The above information disclosed in this Background section is only for enhancement of understanding of the background of the present disclosure and therefore it may contain information that does not form any part of the prior art nor what the prior art may suggest to a person of ordinary skill in the art.

SUMMARY

The present disclosure has been made to solve the above-mentioned problems occurring in the prior art while advantages achieved by the prior art are maintained intact.

An aspect of the present disclosure provides a vehicle suspension control apparatus and method for improving high-speed driving stability of a vehicle by deriving height values of a road surface ahead the vehicle based on information about the road surface that is obtained during high-speed driving, determining a state of the road surface (e.g., an uphill road, a downhill road, or a corrugated road) based on a variance value of the derived height values and differential values of the derived height values, predicting vehicle behavior corresponding to the determined state of the road surfaced, and adjusting the damping force of suspension based on the predicted vehicle behavior.

The technical problems to be solved by the present disclosure are not limited to the aforementioned problems, and any other technical problems not mentioned herein will be clearly understood from the following description by those skilled in the art to which the present disclosure pertains. Also, it will be easily understood that the aspects and advantages of the present disclosure can be accomplished by the means set forth in the appended claims and combinations thereof.

According to an aspect of the present disclosure, an apparatus for controlling suspension of a vehicle includes a sensor that obtains information about a road surface ahead the vehicle during travel of the vehicle and a controller that derives a height value of the road surface from the information about the road surface, determines a state of the road surface based on a differential value of the derived height value, predicts vehicle behavior corresponding to the determined state of the road surface, and controls a damping force of the suspension based on the predicted vehicle behavior.

In an exemplary form of the present disclosure, the state of the road surface may include at least one of an uphill road, a downhill road, or a corrugated road.

In an exemplary form of the present disclosure, the controller may set a point at which the height value of the road surface exceeds a first reference height value and the differential value of the height value of the road surface exceeds a first reference differential value as a determination start time point, may set a point at which the height value of the road surface exceeds a second reference height value and the differential value of the height value of the road surface exceeds the first reference differential value as a determination confirmation time point, and may determine the road surface to be an uphill road, when a distance between the determination start time point and the determination confirmation time point is within a reference distance.

In an exemplary form of the present disclosure, the controller may determine the road surface to be a corrugated road, when the distance between the determination start time point and the determination confirmation time point exceeds the reference distance.

In an exemplary form of the present disclosure, the controller may predict vehicle behavior corresponding to the uphill road and may control the damping force of the suspension based on the predicted vehicle behavior right before entrance to the uphill road.

In one form of the present disclosure, the controller may control the suspension such that the suspension has a damping force harder than a basic damping force.

In another form of the present disclosure, the controller may set a point at which the height value of the road surface is less than or equal to a third reference height value and the differential value of the height value of the road surface is less than or equal to a second reference differential value as a determination start time point, may set a point at which the height value of the road surface is less than or equal to a fourth reference height value and the differential value of the height value of the road surface is less than or equal to the second reference differential value as a determination confirmation time point, and may determine the road surface to be a downhill road, when a distance between the determination start time point and the determination confirmation time point is within a reference distance.

In an exemplary form of the present disclosure, the controller may determine the road surface to be a corrugated road, when the distance between the determination start time point and the determination confirmation time point exceeds the reference distance.

In another exemplary form of the present disclosure, the controller may predict vehicle behavior corresponding to the downhill road and may control the damping force of the suspension based on the predicted vehicle behavior right before entrance to the downhill road.

In another exemplary form of the present disclosure, the controller may control the suspension such that the suspension has a damping force harder than a basic damping force.

In another exemplary form of the present disclosure, the controller may predict vehicle behavior corresponding to the corrugated road and may control the damping force of the suspension based on the predicted vehicle behavior right before entrance to the corrugated road.

In one form of the present disclosure, the controller may control the damping force of the suspension until bounce and pitch of the vehicle are lowered to reference values or less, when the vehicle travels on the corrugated road.

In another form of the present disclosure, the controller may perform a process of determining a state of the road surface, when a variance value of height values of the road surface exceeds a threshold value.

According to another aspect of the present disclosure, a method for controlling suspension of a vehicle includes obtaining, by a sensor, information about a road surface ahead the vehicle during travel of the vehicle, deriving, by a controller, a height value of the road surface from the information about the road surface, determining, by the controller, a state of the road surface based on a differential value of the derived height value, predicting, by the controller, vehicle behavior corresponding to the determined state of the road surface, and controlling, by the controller, a damping force of the suspension based on the predicted vehicle behavior.

In an exemplary form of the present disclosure, the determining of the state of the road surface may include setting a point at which the height value of the road surface exceeds a first reference height value and the differential value of the height value of the road surface exceeds a first reference differential value as a determination start time point, setting a point at which the height value of the road surface exceeds a second reference height value and the differential value of the height value of the road surface exceeds the first reference differential value as a determination confirmation time point, determining the road surface to be an uphill road, when a distance between the determination start time point and the determination confirmation time point is within a reference distance, and determining the road surface to be a corrugated road, when the distance between the determination start time point and the determination confirmation time point exceeds the reference distance.

In an exemplary form of the present disclosure, the controlling of the damping force of the suspension may include predicting vehicle behavior corresponding to the uphill road and controlling the damping force of the suspension based on the predicted vehicle behavior right before entrance to the uphill road.

In an exemplary form of the present disclosure, the determining of the state of the road surface may include setting a point at which the height value of the road surface is less than or equal to a third reference height value and the differential value of the height value of the road surface is less than or equal to a second reference differential value as a determination start time point, setting a point at which the height value of the road surface is less than or equal to a fourth reference height value and the differential value of the height value of the road surface is less than or equal to the second reference differential value as a determination confirmation time point, determining the road surface to be a downhill road, when a distance between the determination start time point and the determination confirmation time point is within a reference distance, and determining the road surface to be a corrugated road, when the distance between the determination start time point and the determination confirmation time point exceeds the reference distance.

In an exemplary form of the present disclosure, the controlling of the damping force of the suspension may include predicting vehicle behavior corresponding to the downhill road and controlling the damping force of the suspension based on the predicted vehicle behavior right before entrance to the downhill road.

In one form of the present disclosure, the controlling of the damping force of the suspension may include predicting vehicle behavior corresponding to the corrugated road, starting to control the damping force of the suspension based on the predicted vehicle behavior right before entrance to the corrugated road, and controlling the damping force of the suspension until bounce and pitch of the vehicle are lowered to reference values or less, when the vehicle travels on the corrugated road.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 38 is an exemplary view illustrating resolution for a downhill road taken during high-speed driving by the camera included in the vehicle suspension control apparatus according to another exemplary form of the present disclosure;

Figure 1:
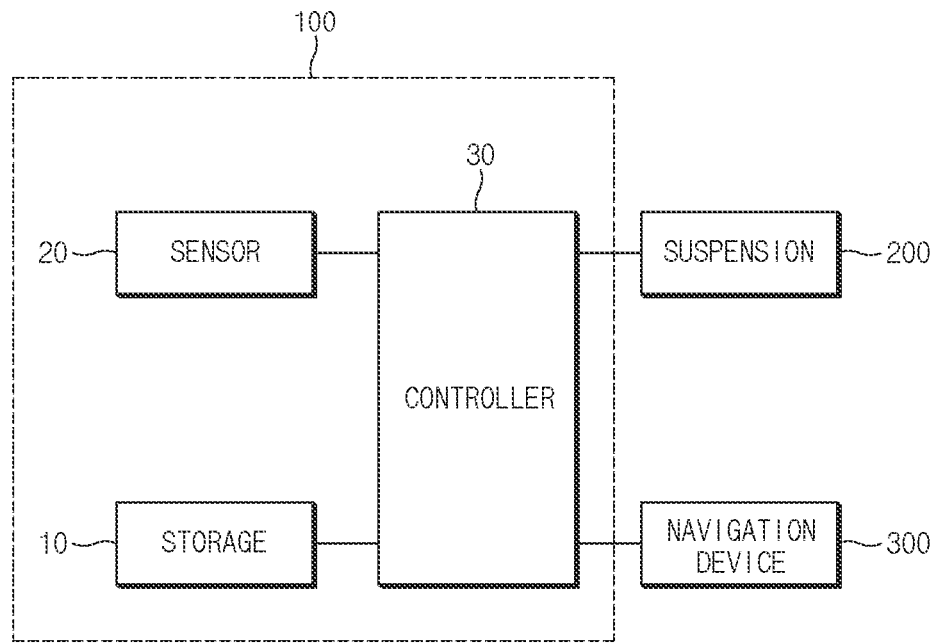
FIG. 1 is a view illustrating a configuration of a vehicle suspension control apparatus according to an exemplary form of the present disclosure.

The drawings described herein are for illustration purposes only and are not intended to limit the scope of the present disclosure in any way.

DETAILED DESCRIPTION

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

The following description is merely exemplary in nature and is not intended to limit the present disclosure, application, or uses. It should be understood that throughout the drawings, corresponding reference numerals indicate like or corresponding parts and features.

In describing the components of the exemplary forms according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a vehicle suspension control apparatus according to an exemplary form of the present disclosure.

As illustrated in FIG. 1, the vehicle suspension control apparatus 100 in one form of the present disclosure may include storage 10, a sensor 20, and a controller 30. Depending on a way of carrying out the vehicle suspension control apparatus 100, the components may be combined together to form one entity or some of the components may be omitted.

The storage 10 may store various logics, algorithms, and programs required in a process of predicting height values of a road surface ahead a vehicle based on information about the road surface that is obtained by the sensor 20 while the vehicle travels at high speed (reference speed, for example, 110 kph), determining a state of the road surface (e.g., an uphill road, a downhill road, or a corrugated road) based on a variance value the predicted height values and differential values of the predicted height values, predicting vehicle behavior corresponding to the determined state of the road surface, and adjusting the damping force of suspension 200 based on the predicted vehicle behavior.

The storage 10 may store control information corresponding to the state of the road surface. The control information, which is damping force control information, may include a damping control value, a sky hook control value, and a preview control value.

The storage 10 may store a reference height value (e.g., 3 cm) and a reference differential value (e.g., 0.5 cm/sampling time) that are used to determine a determination start time point and a reference height value (e.g., 6 cm) and a reference differential value (e.g., 0.5 cm/sampling time) that are used to determine a determination confirmation time pant, as reference values used in a process of determining whether the road surface is an uphill road or a corrugated rod, based on the differential values of the height values of the road surface.

The storage 10 may store a reference height value (e.g., −3 cm) and a reference differential value (e.g., −0.5 cm/sampling time) that are used to determine a determination start time point and a reference height value (e.g., −6 cm) and a reference differential value (e.g., −0.5 cm/sampling time) that are used to determine a determination confirmation time point, as reference values used in a process of determining whether the road surface is a downhill road or a corrugated rod, based on the differential values of the height values of the road surface.

The storage 10 may store information about the road surface (e.g., image data of the road surface, LiDAR data of the road surface, radar data of the road surface, or ultrasonic data of the road surface) that is obtained by the sensor 20.

The storage 10 may include at least one type of storage medium among memories of a flash memory type, a hard disk type, a micro type, and a card type (e.g., a Secure Digital (SD) card or an eXtream Digital (XD) card) and memories of a Random Access Memory (RAM) type, a Static RAM (SRAM) type, a Read-Only Memory (ROM) type, a Programmable ROM (PROM) type, an Electrically Erasable PROM (EEPROM) type, a Magnetic RAM (MRAM) type, a magnetic disk type, and an optical disk type.

The sensor 20 may be implemented with, for example, a camera, a LiDAR sensor, a radar sensor, or an ultrasonic sensor and may obtain information about the road surface ahead the vehicle. Hereinafter, a camera will be described as an example of the sensor 20. The camera may be mounted on a front windshield of the vehicle and may take an image of the road surface ahead the vehicle. The camera may recognize the height depth, and length of the road surface from the image of the road surface ahead the vehicle. The number of points where the camera recognizes height in the image of the road surface may be, for example, 10. The image of the road surface (e.g., an image including a corrugated road surface) that the camera provides to the controller 30 is as illustrated in FIG. 2.

Figure 2:
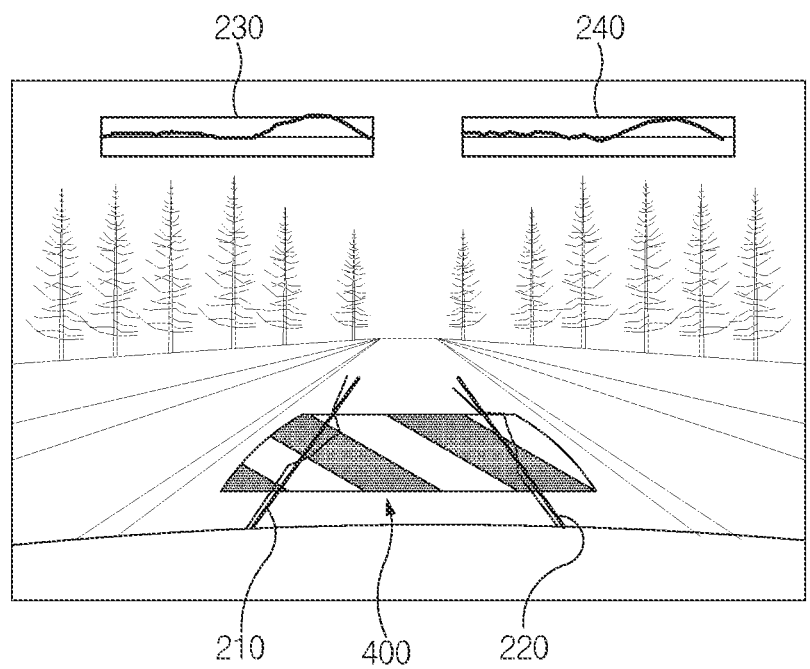
FIG. 2 is an exemplary view illustrating an image of a road surface taken with a camera included in the vehicle suspension control apparatus according to one form of the present disclosure.

FIG. 2 is an exemplary view illustrating an image of a road surface taken with the camera included in the vehicle suspension control apparatus according to an exemplary form of the present disclosure.

As illustrated in FIG. 2, the camera included in the vehicle suspension control apparatus may take an image of a road surface ahead the vehicle and may display the height and length of the road surface in the image of the road surface.

For example, the image of the road surface may include an expected travel path 210 of left wheels of the vehicle and an expected travel path 220 of right wheels of the vehicle and may further include the height 230 of a left side of a bump 400 and the height 240 of a right side of the bump 400. In the reference numbers "230" and "240", the vertical axis represents height, and the horizontal axis represents length. Here, the length represents the distance from the point where the wheels of the vehicle enter the bump 400 to the point where the wheels of the vehicle exit the bump 400.

The camera may transmit, to the controller 30, the image of the road surface (image data) that includes the expected travel path 210 of the left wheels of the vehicle, the expected travel path 220 of the right wheels of the vehicle, the height 230 of the left side of the bump 400, and the height 240 of the right side of the bump 400.

The camera may be electrically connected with the controller 30. The camera may be connected with the controller 30 through a vehicle network. Alternatively, the camera may be connected with the controller 30 through a hard wire. In another case, the camera may be connected with the controller 30 through a Printed Circuit Board (PCB). The camera may transfer, to the controller 30, the image (including the height, depth, and length of the road surface) of the road surface ahead the vehicle. Here, the vehicle network may include a Controller Area Network (CAN), a Controller Area Network with Flexible Data-rate (CAN FD), a Local Interconnect Network (LIN), FlexRay, Media Oriented Systems Transport (MOST), Ethernet, or the like.

The controller 30 may perform overall control to enable the components to normally perform functions thereof. The controller 30 may be implemented in the form of hardware or software, or in a combination thereof. The controller 30 may be implemented with, but is not limited to, a microprocessor.

In particular, the controller 30 may perform various controls in a process of deriving height values of a road surface ahead the vehicle based on information about the road surface that is obtained while the vehicle travels at high speed (e.g., 110 kph), determining a state of the road surface (e.g., an uphill road, a downhill road, or a corrugated road) based on a variance value of the derived height values and differential values of the derived height values, predicting vehicle behavior corresponding to the determined state of the road surface, and adjusting the damping force of the suspension based on the predicted vehicle behavior.

For example, the controller 30 may derive the height values of the road surface from image data of the road surface, may derive the height values of the road surface from LIDAR data of the road surface, may derive the height values of the road surface from radar data of the road surface, or may derive the height values of the road surface from ultrasonic data of the road surface. A process of deriving the height values is a well-known and common technology. Therefore, detailed description thereabout will be omitted.

The controller 30 may be electrically connected with the suspension 200 and may control an operation of the suspension 200.

For reference, the suspension 200 may include a spring (not illustrated) and a damper (not illustrated) that are provided for each vehicle wheel. The suspension 200 is electronically controlled suspension. The spring performs a reciprocating motion while being compressed or stretched depending on a state of a road surface. The damper is a variable damper capable of adjusting the damping force thereof. The controller 30 may control the damping force of the suspension 200.

The damper may damp vibration generated by the spring when the vehicle passes over an obstacle. In other words, the damper may suppress a reciprocating motion of the spring by applying a force in an opposite direction to that of a force generated by the spring. That is, the force suppressing the motion of the spring is referred to as a damping force.

The damper includes a piston rod and a solenoid valve therein. A resistive force generated in a process in which a fluid flows through a fluid channel formed by the piston rod and the solenoid valve refers to a damping force. The damper generates a damping force through a compression stroke and a rebound stroke. Depending on a movement of the solenoid valve, the width of the fluid channel through which the fluid flows may be adjusted, and thus the damping force may be adjusted. The suspension 200 may control the damping force of the damper, based on a damping force control command and/or a damping force control signal that is input from the controller 30.

The controller 30 may collect driving information, road information, traffic information, and the like from a navigation device 300. In particular, the controller 30 may collect, from the navigation device 300, information about a road on which the vehicle travels (e.g., the position, height, and length of a bump, a separation distance from the vehicle, information about the type of bump, curvature, slope, pothole, and the Ike).

The controller 30 may obtain, from various sensors (e.g., a radar, a speed sensor, an acceleration sensor, a gyro sensor, and the like) equipped in the vehicle, various pieces of information or data required in a process of controlling the suspension 200.

For reference, the radar may include a front radar and a corner radar and may obtain the relative position and the relative speed of a surrounding object (e.g., another vehicle, a pedestrian, a cyclist, or the like). The radar may be installed on a grille or a bumper of the vehicle. The radar may obtain radar data from a transmitted electric wave that is transmitted by a transmitting antenna and a reflected electric wave that is received by a receiving antenna.

The radar data may include at least one of information about a road surface ahead the vehicle or distance information and speed information about another vehicle located around the vehicle. The information about the road surface ahead the vehicle may include information about a bump on the road surface. The radar may calculate the relative distance to an object, based on a phase difference (or a time difference) between a transmitted electric wave and a reflected electric wave and may calculate the relative speed of the object, based on a frequency difference between the transmitted electric wave and the reflected electric wave. The radar may be connected with the controller 30 through a vehicle network, a hard wire, or a printed circuit board. The front radar may transfer front radar data to the controller 30. The above-described radar may be replaced with a LiDAR.

The controller 30 may calculate a pitch rate of the vehicle by processing data transferred from the acceleration sensor and the gyro sensor.

In general, when the vehicle travels at high speed, the accuracy of the height of a road surface is lowered due to a decrease in resolution and an increase in noise. For reference, when the vehicle travels at low speed (e.g., 20 kph), resolution is high because 10 recognition points are located within 30 cm. However, when the vehicle travels at high speed (e.g., 130 kph), resolution is low because 10 recognition points are located within 2 m. Hereinafter, resolution during generally widely known high-speed driving will be described with reference to FIGS. 3A to 3C.

Figure 3A:
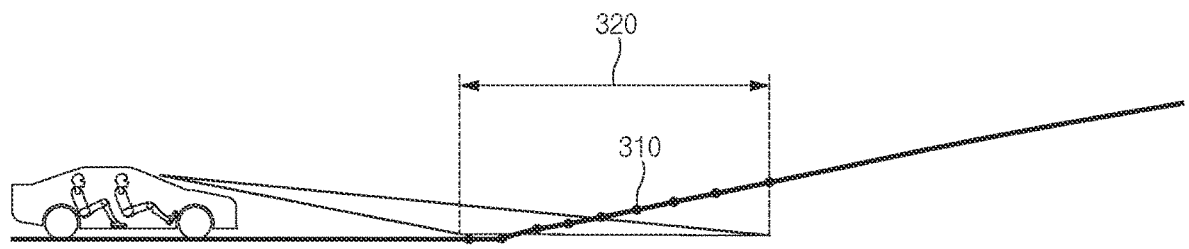
FIG. 3A is an exemplary view illustrating resolution for an uphill road taken during high-speed driving by the camera included in the vehicle suspension control apparatus according to an exemplary form of the present disclosure.

FIG. 3A is an exemplary view illustrating resolution for an uphill road taken during high-speed driving by the camera included in the vehicle suspension control apparatus according to one form of the present disclosure.

As illustrated in FIG. 3A, when the vehicle travels at high speed (e.g., 130 kph), points (hereinafter, referred to as recognition points 310) where the height of a road surface is recognized in an image of the road surface taken with the camera included in the vehicle suspension control apparatus are distributed over a wide area 320 (e.g., 2 m) beyond an effective distance (e.g., 30 cm). Because resolution is lowered when the recognition points 310 are not distributed within the effective distance, it is difficult to accurately determine whether the road surface ahead the vehicle is an uphill road, by using a general method.

Figure 3B:
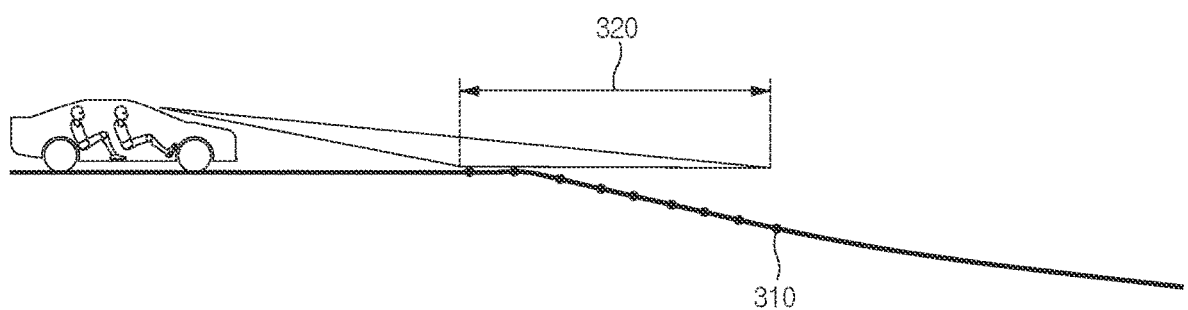
FIG. 3C is an exemplary view illustrating resolution for a corrugated road taken during high-speed driving by the camera included in the vehicle suspension control apparatus according to one form of the present disclosure.

FIG. 3B is an exemplary view illustrating resolution for a downhill road taken during high-speed driving by the camera included in the vehicle suspension control apparatus according to an exemplary form of the present disclosure.

As illustrated in FIG. 3B, when the vehicle travels at high speed (e.g., 130 kph), recognition points 310 in an image of a road surface taken with the camera included in the vehicle suspension control apparatus are distributed over a wide area 320 beyond the effective distance (e.g., 30 cm). Because resolution is lowered when the recognition points 310 are not distributed within the effective distance, it is difficult to accurately determine whether the road surface ahead the vehicle is a downhill road, by using a general method.

Figure 3C:
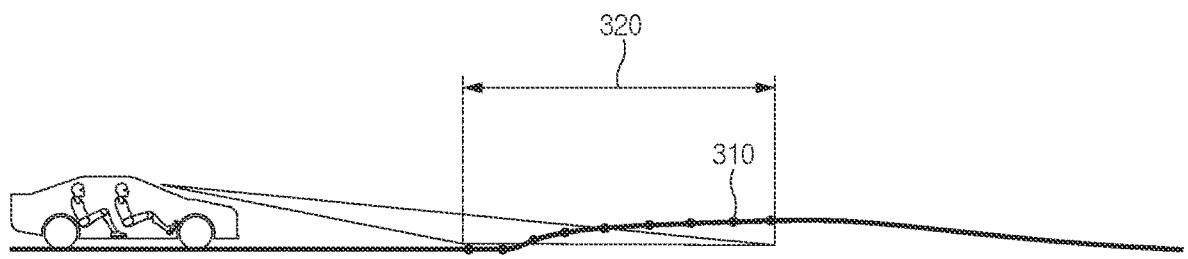

FIG. 3C is an exemplary view illustrating resolution for a corrugated road taken during high-speed driving by the camera included in the vehicle suspension control apparatus according to another form of the present disclosure.

As illustrated in FIG. 3C, when the vehicle travels at high speed (e.g., 130 kph), recognition points 310 in an image of a road surface taken with the camera included in the vehicle suspension control apparatus are distributed over a wide area 320 beyond the effective distance (e.g., 30 cm). Because resolution is lowered when the recognition points 310 are not distributed within the effective distance, it is difficult to accurately determine whether the road surface ahead the vehicle is a corrugated road, by using a general method.

Hereinafter, a process in which the controller 30 determines a state of a road surface (e.g., an uphill road, a downhill road, or a corrugated road) based on height values of the road surface that are obtained during high-speed driving will be described in detail with reference to FIGS. 4 to 6. The controller 30 may perform a process of determining whether the road surface is a flat road or an inclined road, and when the road surface is determined to be a flat road, the controller 30 may perform the process of determining the state of the road surface. For example, when a variance value of height values of the road surface exceeds a threshold value (e.g., 0), the controller 30 may determine the road surface to be an inclined road (e.g., an uphill, a downhill, or a corrugated road), and when the variance value does not exceed the threshold value, the controller 30 may determine the road surface to be a flat road.

Figure 4:
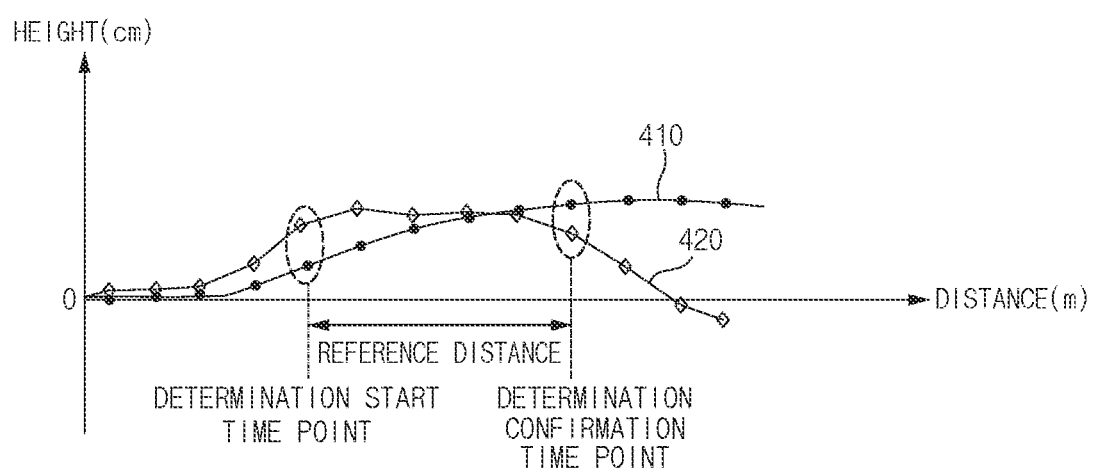
FIG. 4 is an exemplary view illustrating a process in which a controller included in the vehicle suspension control apparatus determines a road surface to be an uphill road according to an exemplary form of the present disclosure.

FIG. 4 is an exemplary view illustrating a process in which the controller included in the vehicle suspension control apparatus determines a road surface to be an uphill road according to an exemplary form of the present disclosure.

In FIG. 4, the vertical axis represents the height of the road surface, and the horizontal axis represents the length of the road surface. The length of the road surface is a distance in a direction in which the vehicle travels. "410" represents a height profile of the road surface, and "420" represents differential values of the height profile of the road surface.

The controller 30 may monitor height values of the road surface that are obtained during high-speed driving and may calculate differential values of the height values.

Thereafter, the controller 30 may determine whether the road surface is an uphill road, based on the height values of the road surface and the differential values of the height values of the road surface. For example, the controller 30 may set a point where a height value of the road surface exceeds a reference height value (e.g., 3 cm) and a differential value of the height value of the road surface exceeds a reference differential value (e.g., 0.5 cm/sampling time) as a determination start time point, may set a point where a height value of the road surface exceeds a reference height value (e.g., 6 cm) and a differential value of the height value of the road surface exceeds a reference differential value (e.g., 0.5 cm/sampling time) as a determination confirmation time point, and may determine the road surface to be an uphill road when the distance between the determination start time point and the determination confirmation time point is within a reference distance. The reference distance may be increased or decreased in proportion to the speed of the vehicle.

Meanwhile, the controller 30 may determine the road surface to be a corrugated road when the distance between the determination start time point and the determination confirmation time point exceeds the reference distance.

Figure 5:
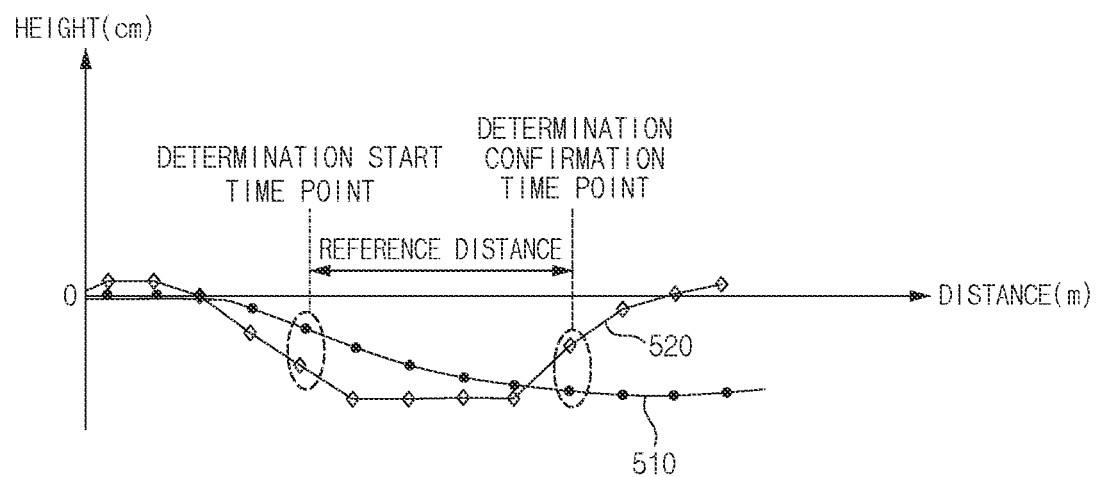
FIG. 5 is an exemplary view illustrating a process in which the controller included in the vehicle suspension control apparatus determines a road surface to be a downhill road according to an exemplary form of the present disclosure.

FIG. 5 is an exemplary view illustrating a process in which the controller included in the vehicle suspension control apparatus determines a road surface to be a downhill road according to an exemplary form of the present disclosure.

In FIG. 5, the vertical axis represents the height of the road surface, and the horizontal axis represents the length of the road surface. The length of the road surface is a distance in a direction in which the vehicle travels. "510" represents a height profile of the road surface, and "520" represents differential values of the height profile of the road surface. Here, minus height values represent depth values.

The controller 30 may monitor height values of the road surface that are obtained during high-speed driving and may calculate differential values of the height values.

Thereafter, the controller 30 may determine whether the road surface is a downhill road, based on the height values of the road surface and the differential values of the height values of the road surface. For example, the controller 30 may set a point where a height value of the road surface is less than or equal to a reference height value (e.g., −3 cm) and a differential value of the height value of the road surface is less than or equal to a reference differential value (e.g., −0.5 cm/sampling time) as a determination start time point, may set a point where a height value of the road surface is less than or equal to a reference height value (e.g., −6 cm) and a differential value of the height value of the road surface is less than or equal to a reference differential value (e.g., −0.5 cm/sampling time) as a determination confirmation time point, and may determine the road surface to be a downhill road when the distance between the determination start time point and the determination confirmation time point is within a reference distance. The reference distance may be increased or decreased in proportion to the speed of the vehicle.

Meanwhile, the controller 30 may determine the road surface to be a corrugated road when the distance between the determination start time point and the determination confirmation time point exceeds the reference distance.

Figure 6:
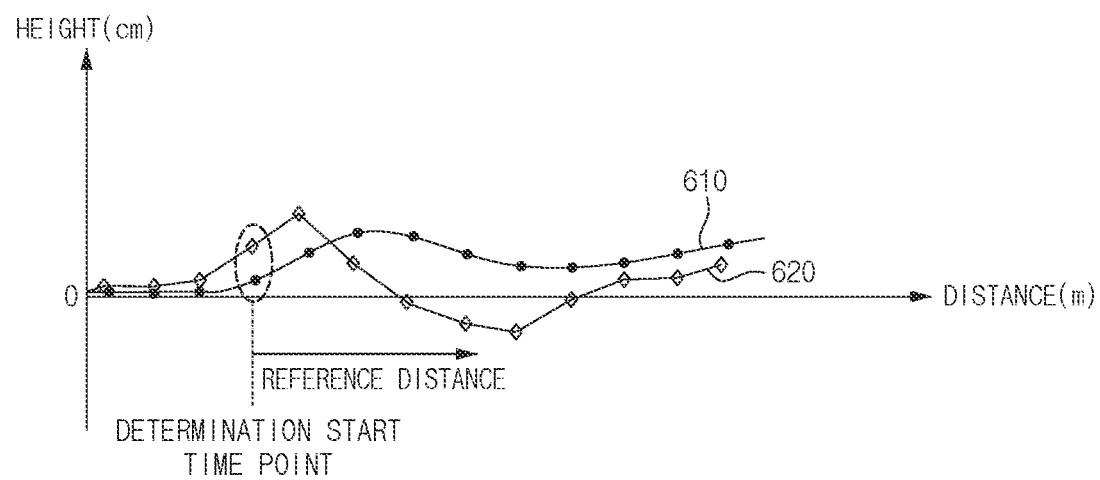
FIG. 6 is an exemplary view illustrating a process in which the controller included in the vehicle suspension control apparatus determines a road surface to be a corrugated road according to an exemplary form of the present disclosure.

FIG. 6 is an exemplary view illustrating a process in which the controller included in the vehicle suspension control apparatus determines a road surface to be a corrugated road according to another form of the present disclosure.

In FIG. 6, the vertical axis represents the height of the road surface, and the horizontal axis represents the length of the road surface. The length of the road surface is a distance in a direction in which the vehicle travels. "610" represents a height profile of the road surface, and "620" represents differential values of the height profile of the road surface.

As illustrated in FIG. 6, the controller 30 sets a determination start time point, but fails to set a determination confirmation time point within a reference distance from the determination start time point. That is, there is no point where a height value of the road surface exceeds a reference height value (e.g., 6 cm) and a differential value of the height value of the road surface exceeds a reference differential value (e.g., 0.5 cm/sampling time). Accordingly, the controller 30 may determine the road surface to be a corrugated road.

Hereinafter, a method of controlling, by the controller 30, the damping force of the suspension 200 based on a state of a road surface will be described in detail with reference to FIGS. 7 to 9.

Figure 7:
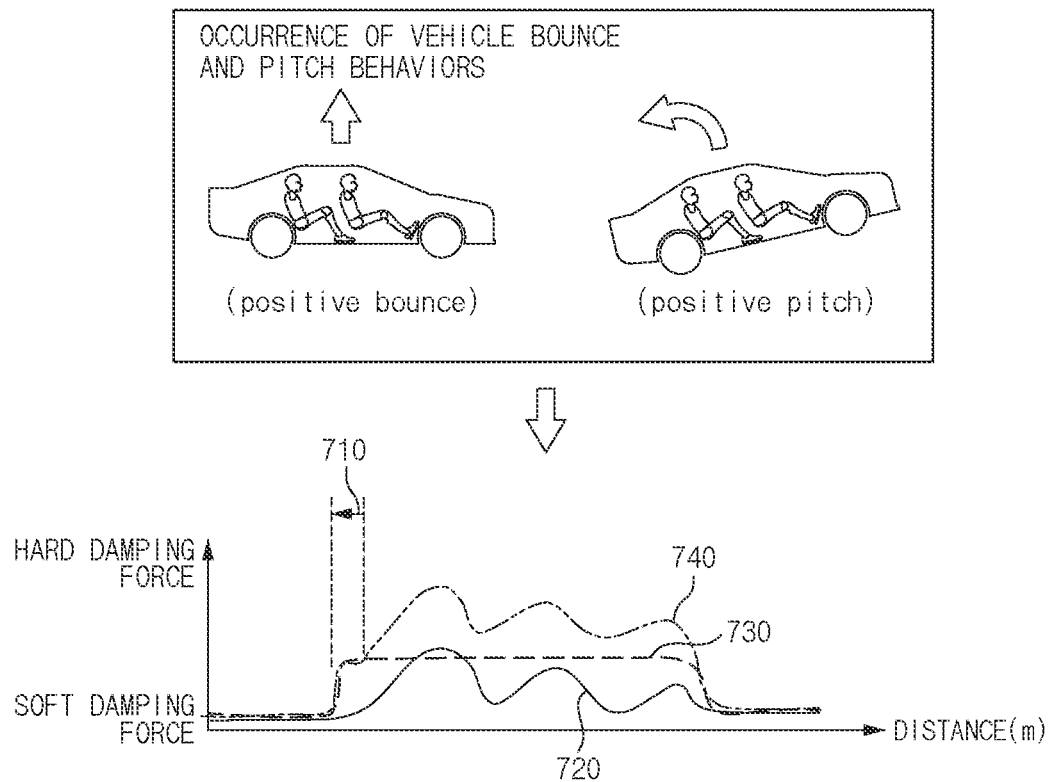
FIG. 7 is an exemplary view illustrating a process in which the controller included in the vehicle suspension control apparatus controls suspension when a road surface is an uphill road according to an exemplary form of the present disclosure.

FIG. 7 is an exemplary view illustrating a process in which the controller included in the vehicle suspension control apparatus controls the suspension when a road surface is an uphill road according to an exemplary form of the present disclosure.

As illustrated in FIG. 7, when the vehicle enters the uphill road, behaviors of the vehicle, such as positive bounce by which the vehicle moves up and positive pitch by which front wheels of the vehicle move up, may occur.

Accordingly, the controller 30 may adjust a sky hook upward bounce gain and a pitch gain to control the suspension 200 such that the suspension 200 has a damping force harder than a damping force on a flat road (a basic damping force).

Furthermore, the controller 30 may add an offset hard damping force depending on the speed of the vehicle because it is difficult to accurately estimate timing for compression and rebound of the damper during high-speed driving and it is difficult to rapidly respond due to the nature of a damper actuator. That is, the controller 30 may advance time to control the damping force of the suspension 200. Right before the behaviors of the vehicle occur (right before the vehicle enters the uphill road), the controller 30 may perform control such that the suspension 200 has a damping force harder than the damping force on the flat road (710). In FIG. 7, the reference number "720" represents a sky hook control value (a feedback control value), the reference number "730" represents an offset control value (a feed forward control value), and the reference number "740" represents the final control value as the sum of the sky hook control value and the offset control value.

Figure 8:
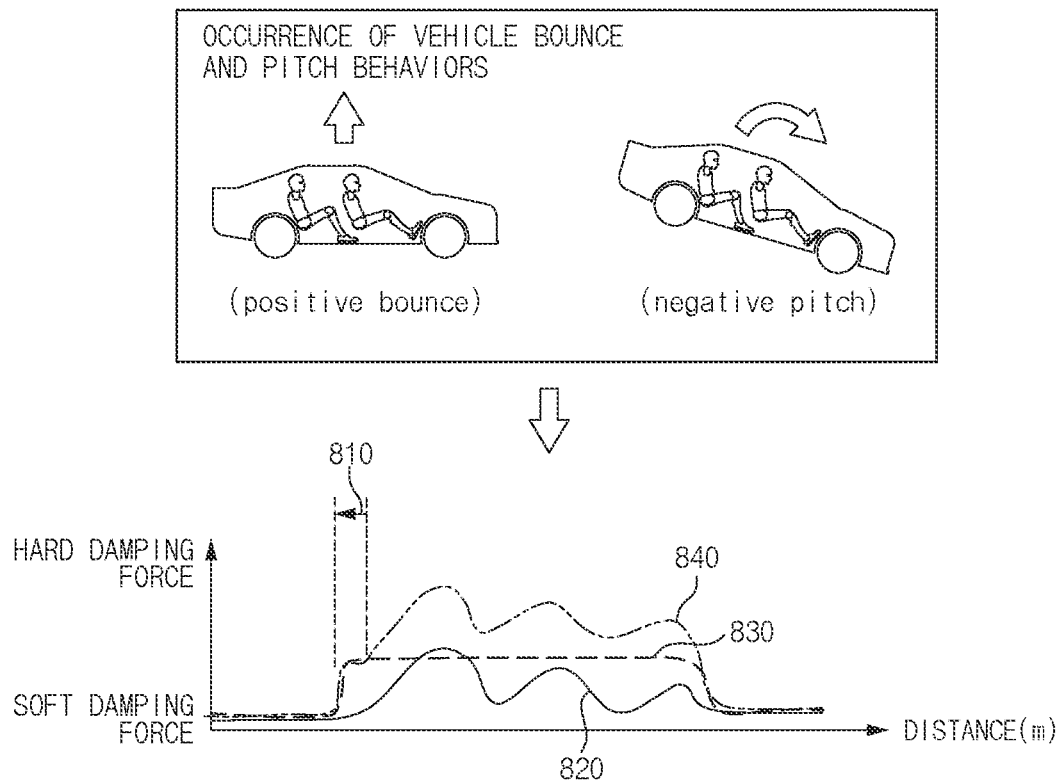
FIG. 8 is an exemplary view illustrating a process in which the controller included in the vehicle suspension control apparatus controls the suspension when a road surface is a downhill road according to an exemplary form of the present disclosure.

FIG. 8 is an exemplary view illustrating a process in which the controller included in the vehicle suspension control apparatus controls the suspension when a road surface is a downhill road according to an exemplary form of the present disclosure.

As illustrated in FIG. 8, when the vehicle enters the downhill road, behaviors of the vehicle, such as negative bounce by which the vehicle moves down and negative pitch by which the front wheels of the vehicle move down, may occur.

Accordingly, the controller 30 may adjust a sky hook downward bounce gain and a pitch gain to control the suspension 200 such that the suspension 200 has a damping force harder than a damping force on a flat road.

Furthermore, the controller 30 may add an offset hard damping force depending on the speed of the vehicle because it is difficult to accurately estimate timing for compression and rebound of the damper during high-speed diving and it is difficult to rapidly respond due to the nature of the damper actuator. That is, the controller 30 may advance time to control the damping force of the suspension 200. Right before the behaviors of the vehicle occur (right before the vehicle enters the downhill road), the controller 30 may perform control such that the suspension 200 has a damping force harder than the damping force on the flat road (810). In FIG. 8, the reference number "820" represents a sky hook control value (a feedback control value), "830" represents an offset control value (a feed forward control value), and the reference number "840" represents the final control value as the sum of the sky hook control value and the offset control value.

Figure 9:
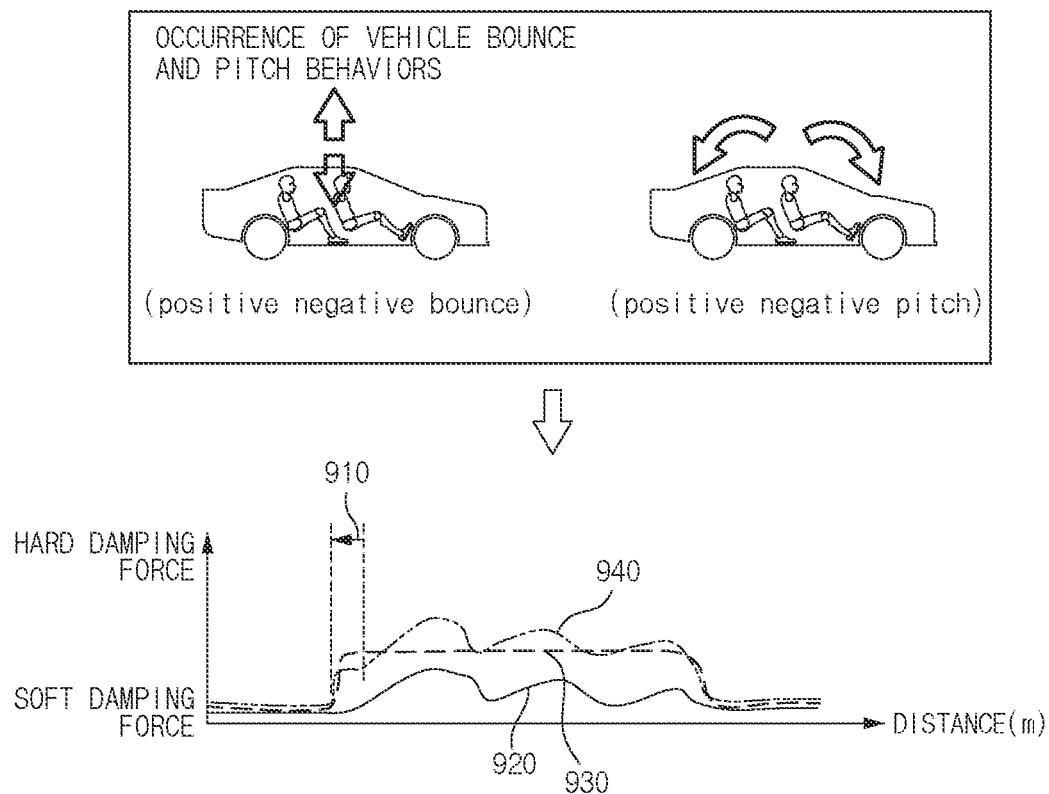
FIG. 9 is an exemplary view illustrating a process in which the controller included in the vehicle suspension control apparatus controls the suspension when a road surface is a corrugated road according to another form of the present disclosure.

FIG. 9 is an exemplary view illustrating a process in which the controller included in the vehicle suspension control apparatus controls the suspension when a road surface is a corrugated road according to another form of the present disclosure.

As illustrated in FIG. 9, when the vehicle enters the corrugated road, behaviors of the vehicle, such as positive negative bounce by which the vehicle moves up and down and positive negative pitch by which the front wheels of the vehicle move up and down, may occur.

Accordingly, the controller 30 may adjust a sky hook downward bounce gain and a pitch gain to control the suspension 200 such that the suspension 200 has a damping force harder than a damping force on a flat road. The controller 30 may control the suspension 200 such that the suspension 200 has a damping force softer than those on the uphill and downhill roads.

Furthermore, the controller 30 may add an offset hard damping force depending on the speed of the vehicle because it is difficult to accurately estimate timing for compression and rebound of the damper during high-speed driving and it is difficult to rapidly respond due to the nature of the damper actuator. That is, the controller 30 may advance time to control the damping force of the suspension 200. Right before the behaviors of the vehicle occur (right before the vehicle enters the corrugated road), the controller 30 may perform control such that the suspension 200 has a medium hard damping force (910). In FIG. 9, the reference number "920" represents a sky hook control value (a feedback control value), the reference number "930" represents an offset control value (a feed forward control value), and the reference number "940" represents the final control value as the sum of the sky hook control value and the offset control value.

When the vehicle travels on the corrugated road, the controller 30 may control the damping force of the suspension 200 until the bounce and pitch of the vehicle are lowered to reference values or less. That is, the controller 30 may control the damping force of the suspension 200 until a bounce speed (up and down movement) passing through a first Low Pass Filter (LPF) is lower than or equal to a first reference value and a pitch speed passing through a second LPF is lower than or equal to a second reference value. When the two conditions are all satisfied, the controller 30 may stop controlling the damping force of the suspension 200.

Figure 10:
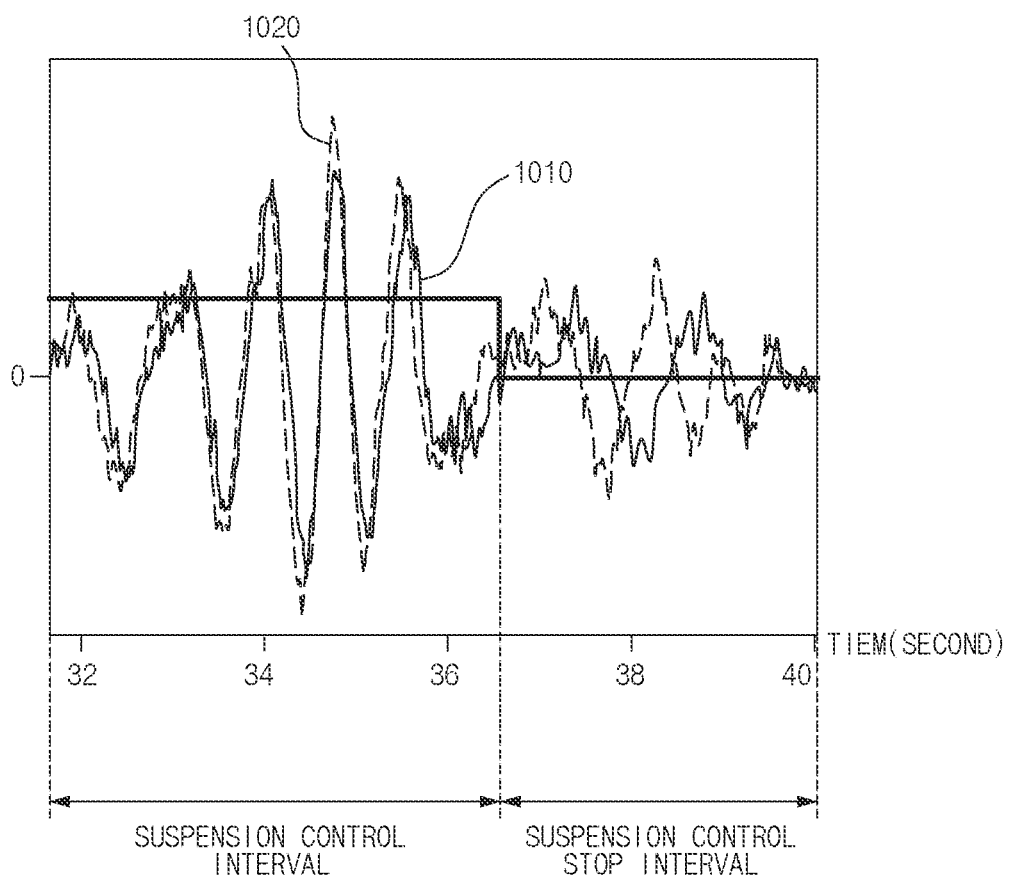
FIG. 10 is a performance analysis diagram of the vehicle suspension control apparatus according to an exemplary form of the present disclosure.

FIG. 10 is a performance analysis diagram of the vehicle suspension control apparatus according to one form of the present disclosure. FIG. 10 illustrates bounce speeds of the vehicle.

In FIG. 10, a suspension control interval represents a state in which the bounce speed passing through the first Low Pass Filter (LPF) exceeds the first reference value, a state in which the pitch speed passing through the second LPF exceeds the second reference value, or a state in which the bounce speed passing through the first Low Pass Filter (LPF) exceeds the first reference value and the pitch speed passing through the second LPF exceeds the second reference value. A suspension control stop interval represents a state in which the bounce speed passing through the first Low Pass Filter (LPF) is lower than or equal to the first reference value and the pitch speed passing through the second LPF is lower than or equal to the second reference value.

It can be seen that, as illustrated in FIG. 10, when the present disclosure is applied (1010), the bounce speed of the vehicle (the up and down movement) is decreased, as compared with when the present disclosure is not applied (1020).

Figure 11:
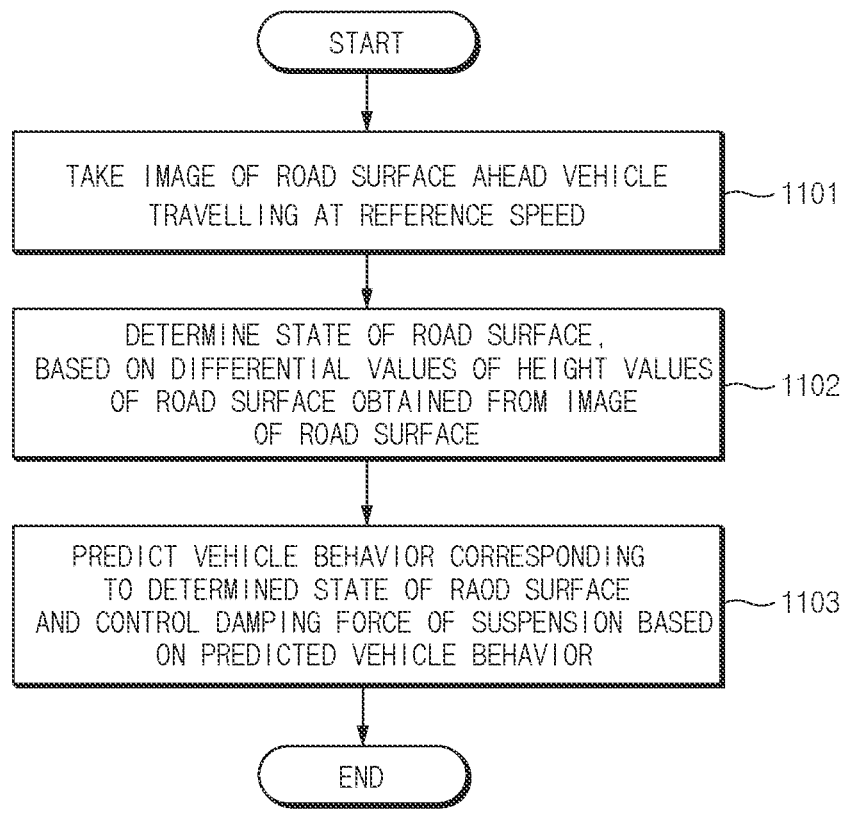
FIG. 11 is a flowchart illustrating a vehicle suspension control method according to an exemplary form of the present disclosure.

FIG. 11 is a flowchart illustrating a vehicle suspension control method according to another form of the present disclosure, where the sensor is implemented with a camera.

First, the camera takes an image of a road surface ahead the vehicle that travels at the reference speed (at step 1101). That is, the sensor 20 obtains information about the road surface ahead the vehicle during travel of the vehicle.

Next, the controller 30 determines a state of the road surface, based on differential values of height values of the road surface that are obtained from the image of the road surface ahead the vehicle (at step 1102). That is, the controller 30 derives height values of the road surface from the road-surface information obtained by the sensor 20 and determines a state of the road surface, based on differential values of the derived height values. The controller 30 may determine the road surface to be one of an uphill road, a downhill road, or a corrugated road.

Thereafter, the controller 30 predicts vehicle behavior corresponding to the determined state of the road surface and controls the damping force of the suspension based on the predicted vehicle behavior (at step 1103).

Figure 12:
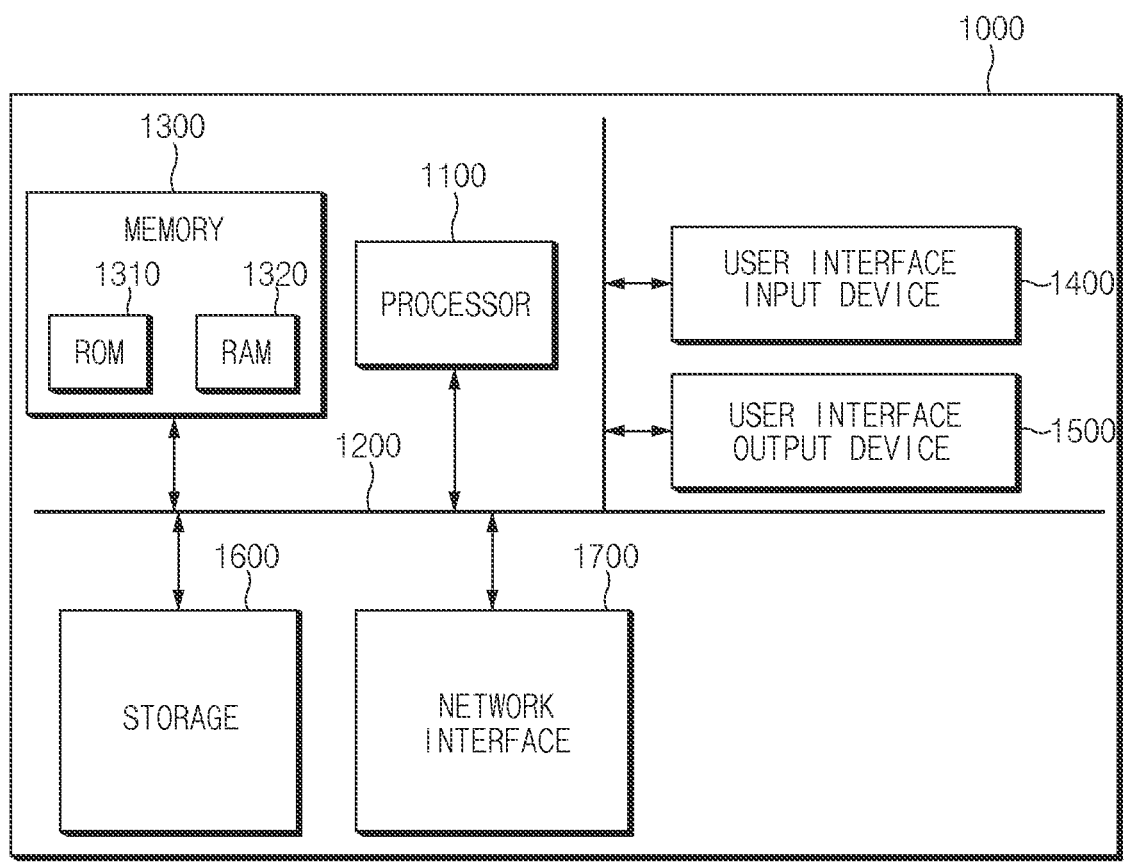
FIG. 12 is a block diagram illustrating a computing system for executing the vehicle suspension control method according to an exemplary form of the present disclosure.

FIG. 12 is a block diagram illustrating a computing system for executing the vehicle suspension control method according to another form of the present disclosure.

Referring to FIG. 12, the vehicle suspension control method may be implemented through the computing system. The computing system 1000 may include at least one processor 1100, a memory 1300, a user interface input device 1400, a user interface output device 1500, storage 1600, and a network interface 1700, which are connected with each other via a system bus 1200.

The processor 1100 may be a Central Processing Unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an Application Specific Integrated Circuit (ASIC). The ASIC may reside within a user terminal. In another case, the processor 1100 and the storage medium may reside in the user terminal as separate components.

As described above, the vehicle suspension control apparatus and method predicts height values of a road surface ahead the vehicle based on information about the road surface that is obtained during high-speed driving, determines a state of the road surface (e.g., an uphill road, a downhill road, or a corrugated road) based on a variance value of the predicted height values and differential values of the predicted height values, predicts vehicle behavior corresponding to the determined state of the road surfaced, and adjusts the damping force of the suspension based on the predicted vehicle behavior, thereby improving high-speed driving stability of the vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An apparatus for controlling a suspension of a vehicle, the apparatus comprising:
a sensor configured to obtain information about a road surface ahead of the vehicle during travel of the vehicle; and
a controller configured to:
derive a height value of the road surface from the information about the road surface,
determine a state of the road surface based on a differential value of the derived height value, wherein the state of the road surface is determined as at least one of an uphill road, a downhill road, or a corrugated road,
set a point at which the derived height value of the road surface exceeds a first reference height value and the differential value of the derived height value of the road surface exceeds a first reference differential value as a determination start time point,
set a point at which the derived height value of the road surface exceeds a second reference height value and the differential value of the derived height value of the road surface exceeds the first reference differential value as a determination confirmation time point,
determine the road surface as the uphill road, when a distance between the determination start time point and the determination confirmation time point is within a reference distance, wherein the reference distance is increased or decreased in proportion to a speed of the vehicle,
predict a vehicle behavior corresponding to the determined state of the road surface, and
control a damping force of the suspension based on the predicted vehicle behavior.

2. The apparatus of claim 1, wherein the controller is configured to determine the road surface as the corrugated road, when the distance between the determination start time point and the determination confirmation time point exceeds the reference distance.

3. The apparatus of claim 1, wherein the controller is configured to predict a vehicle behavior corresponding to the uphill road and control the damping force of the suspension based on the predicted vehicle behavior right before entrance to the uphill road.

4. The apparatus of claim 3, wherein the controller is configured to control the suspension such that the suspension has the damping force harder than a basic damping force.

5. The apparatus of claim 1, wherein the controller is configured to:
set a point at which the derived height value of the road surface is less than or equal to a third reference height value and the differential value of the derived height value of the road surface is less than or equal to a second reference differential value as another determination start time point,
set a point at which the derived height value of the road surface is less than or equal to a fourth reference height value and the differential value of the derived height value of the road surface is less than or equal to the second reference differential value as another determination confirmation time point, and
determine the road surface as the downhill road, when a distance between the another determination start time point and the another determination confirmation time point is within a reference distance.

6. The apparatus of claim 5, wherein the controller is configured to determine the road surface as the corrugated road, when the distance between the determination start time point and the determination confirmation time point exceeds the reference distance.

7. The apparatus of claim 5, wherein the controller is configured to predict a vehicle behavior corresponding to the downhill road and control the damping force of the suspension based on the predicted vehicle behavior right before entrance to the downhill road.

8. The apparatus of claim 7, wherein the controller is configured to control the suspension such that the suspension has the damping force harder than a basic damping force.

9. The apparatus of claim 1, wherein the controller is configured to predict a vehicle behavior corresponding to the corrugated road and control the damping force of the suspension based on the predicted vehicle behavior right before entrance to the corrugated road.

10. The apparatus of claim 9, wherein when the vehicle travels on the corrugated road, the controller is configured to control the damping force of the suspension until a bounce and a pitch of the vehicle are equal to or less than reference values.

11. The apparatus of claim 1, wherein when a variance value of height values of the road surface exceeds a threshold value, the controller is configured to perform a process of determining the state of the road surface.

12. A method for controlling a suspension of a vehicle, the method comprising:
obtaining, by a sensor, information about a road surface ahead of the vehicle during travel of the vehicle;
deriving, by a controller, a height value of the road surface from the obtained information about the road surface;
determining, by the controller, a state of the road surface based on a differential value of the derived height value, wherein the state of the road surface is determined as at least one of an uphill road, a downhill road, or a corrugated road;
setting a point at which the derived height value of the road surface exceeds a first reference height value and the differential value of the derived height value of the road surface exceeds a first reference differential value as a determination start time point;
setting a point at which the derived height value of the road surface exceeds a second reference height value and the differential value of the derived height value of the road surface exceeds the first reference differential value as a determination confirmation time point;
in response to determining that a distance between the determination start time point and the determination confirmation time point is within a reference distance, determining the road surface as the uphill road, wherein the reference distance is increased or decreased in proportion to a speed of the vehicle;
in response to determining that the distance between the determination start time point and the determination confirmation time point exceeds the reference distance, determining the road surface as the corrugated road;

predicting, by the controller, a vehicle behavior corresponding to the determined state of the road surface; and controlling, by the controller, a damping force of the suspension based on the predicted vehicle behavior.

13. The method of claim 12, wherein controlling the damping force of the suspension includes:
predicting a vehicle behavior corresponding to the uphill road; and
controlling the damping force of the suspension based on the predicted vehicle behavior right before entrance to the uphill road.

14. The method of claim 12, wherein determining the state of the road surface includes:
setting a point at which the derived height value of the road surface is less than or equal to a third reference height value and the differential value of the derived height value of the road surface is less than or equal to a second reference differential value as another determination start time point;
setting a point at which the derived height value of the road surface is less than or equal to a fourth reference height value and the differential value of the derived height value of the road surface is less than or equal to the second reference differential value as another determination confirmation time point;
in response to determining that a distance between the another determination start time point and the another determination confirmation time point is within a reference distance, determining the road surface as the downhill road; and
in response to determining that the distance between the another determination start time point and the another determination confirmation time point exceeds the reference distance, determining the road surface as the corrugated road.

15. The method of claim 14, wherein controlling the damping force of the suspension includes:
predicting a vehicle behavior corresponding to the downhill road; and
controlling the damping force of the suspension based on the predicted vehicle behavior right before entrance to the downhill road.

16. The method of claim 12, wherein controlling the damping force of the suspension includes:
predicting a vehicle behavior corresponding to the corrugated road;
starting to control the damping force of the suspension based on the predicted vehicle behavior right before entrance to the corrugated road; and
controlling the damping force of the suspension until a bounce and a pitch of the vehicle are equal to or less than reference values, when the vehicle travels on the corrugated road.

* * * * *